A. C. DODGE.
WEIGHING MACHINE.
APPLICATION FILED SEPT. 22, 1915.

1,236,686.

Patented Aug. 14, 1917.
3 SHEETS—SHEET 1.

Inventor
Alfred C. Dodge
By his Attorney John F. Nolan

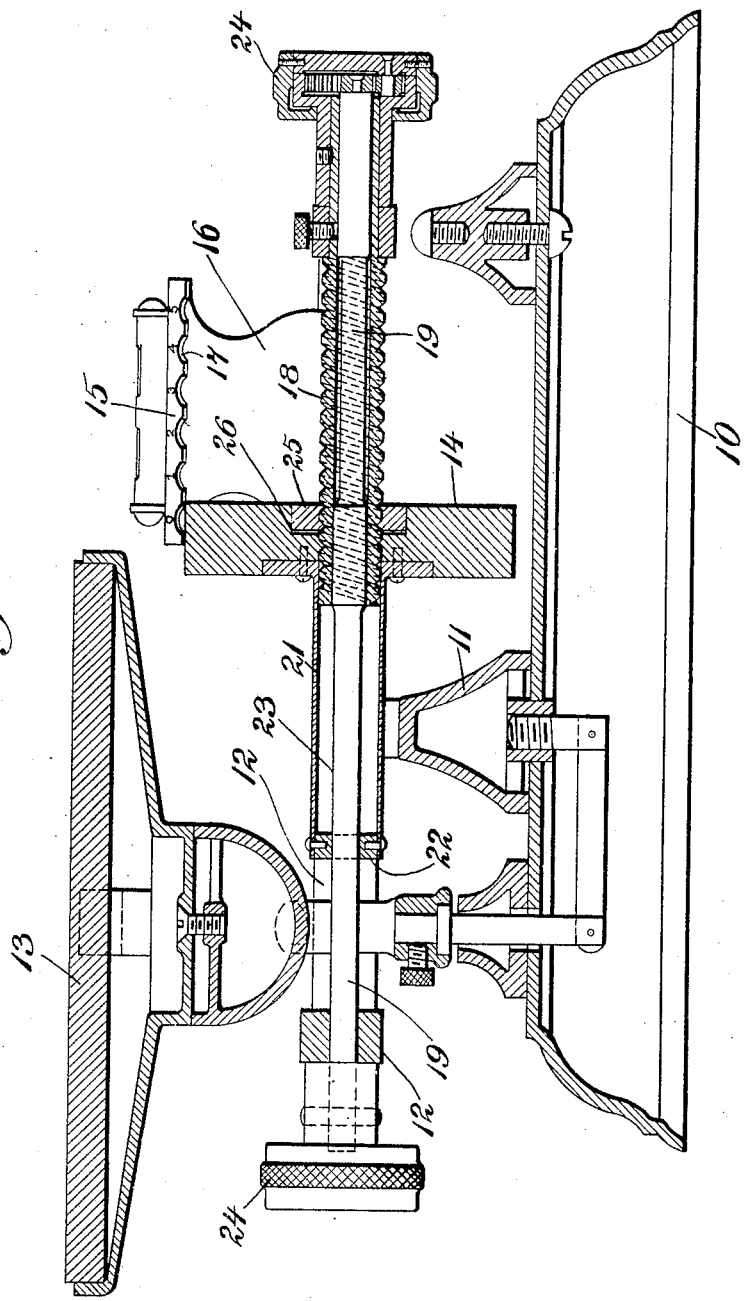

A. C. DODGE.
WEIGHING MACHINE.
APPLICATION FILED SEPT. 22, 1915.
1,236,686.
Patented Aug. 14, 1917.
3 SHEETS—SHEET 3.
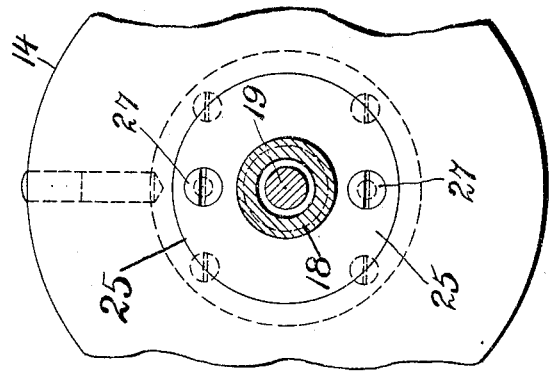
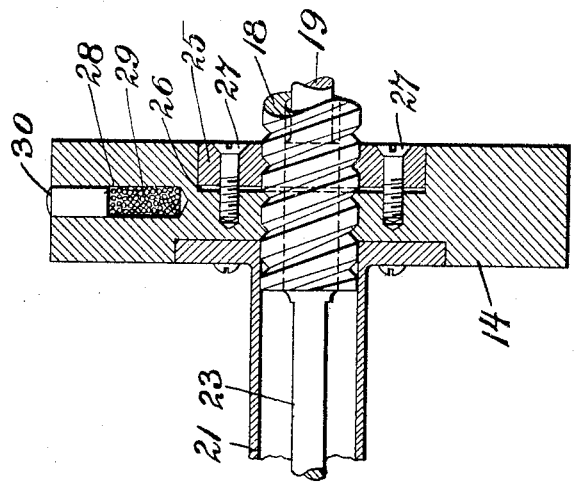
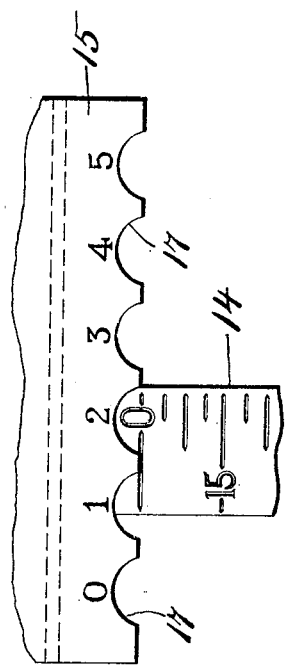
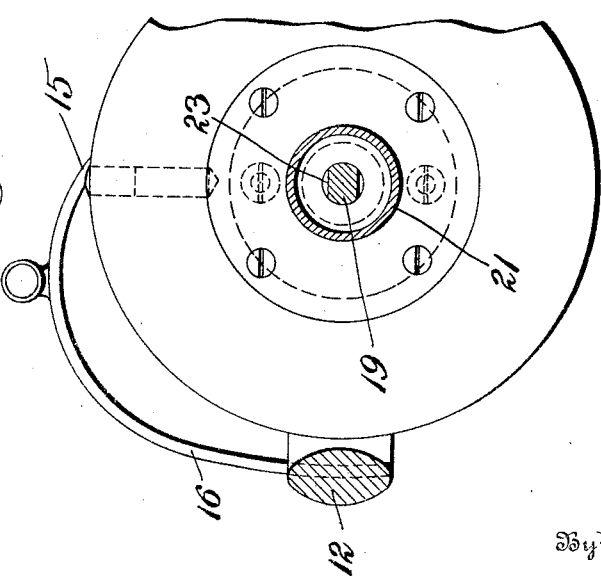
Inventor
Alfred C. Dodge
By his Attorney
John R. Nolan

UNITED STATES PATENT OFFICE.

ALFRED C. DODGE, OF YONKERS, NEW YORK.

WEIGHING-MACHINE.

1,236,686.   Specification of Letters Patent.   Patented Aug. 14, 1917.

Application filed September 22, 1915.   Serial No. 51,970.

*To all whom it may concern:*

Be it known that I, ALFRED C. DODGE, a citizen of the United States, and resident of Yonkers, in the county of Westchester and State of New York, have invented certain new and useful Improvements in Weighing-Machines, of which the following is a specification.

In my Letters Patent of the United States No. 1,180,380 dated April 25, 1916, I have set forth certain improvements in and relating to weighing machines which are especially applicable to beam or lever scales; the machine therein described comprising among other things a rotary, longitudinally movable poise carrying fractional graduations, a fixed scale operatively associated therewith carrying the unit graduations, and means longitudinally fixed on the beam for effecting and controlling the movements of the poise in relation thereto.

The present invention, briefly stated, comprises certain improvements in my previous structure with the object of insuring the setting and reading of the scale members with greater facility and accuracy than heretofore, and with the further object of simplifying and rendering more certain in its operation the means for rotating the poise and moving it longitudinally in relation to the beam.

With these and other objects in view my invention comprehends various novel features of construction and combinations of parts which will be hereinafter fully described and claimed.

While I have herein illustrated a preferred form of embodiment of my invention, it is to be understood that I do not restrict myself to the specific details of construction shown and described, as the structure may be modified in various particulars without departing from the principle of the invention.

In the drawings—

Fig. 2 is a longitudinal vertical section thereof, the material support being indicated.

Fig. 3 is an elevation, enlarged, of the units scale and an adjacent part of the fractional scale on the rotary poise.

Fig. 4 is a vertical section through the poise and the adjacent part of the adjusting mechanism therefor.

Fig. 5 is a partial sectional side view of Fig. 4, showing the units-scale and adjuncts.

Fig. 6 is a similar view of the opposite side of the poise.

Figure 1:
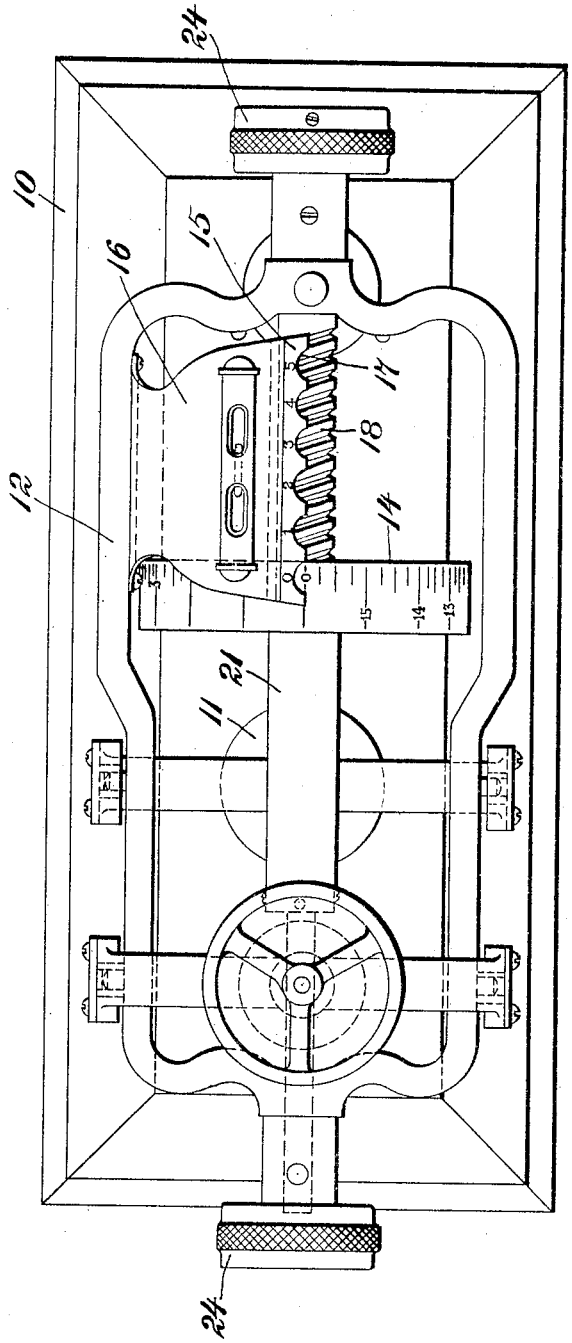
Figure 1 is a partial plan view of a weighing machine embodying my invention.

Referring to the drawings, 10 designates a base; 11 a standard thereon; and 12 a beam pivotally mounted on said standard and equipped with a suitable support, as 13, for the material to be weighed. A poise 14 is mounted upon the beam so as to have capacity for rotary and longitudinal movement thereon. This poise, which is operated as hereinafter described, comprises a circular body provided on its periphery with a "fractional scale" comprising fractional graduations and indicating numbers or other characters associated therewith to designate ounces, for example. The poise body is preferably composed of lead or other soft metal upon which the graduations and characters of the fractional scale may be sharply and clearly impressed by stamping. Such characters are disposed in spiral order, as shown, in order that in each rotation of the poise they shall successively appear directly beneath the proximate unit (or pound) graduations, or the numbers representing them, upon a relatively fixed scale member 15. The scale member 15 is constituted by the upper portion of a plate 16, preferably of thin metal, which is mounted on one side of the beam, so that such scale member overhangs the path of the poise and extends parallel to the axis of the latter, the lower edge of the plate being in contact with the periphery of the poise.

A feature of my present invention concerns the structure of the scale member 15 and the relative disposition thereon of the unit graduations, or the numbers representing them, whereby such indications and the fractional indications on the poise may be brought into close proximity to each other in such a manner as to insure the setting and reading of the apparatus with greater facility and accuracy than in my previous construction. Accordingly the lower horizontal edge of the scale member 15 is serrated or scalloped as shown, that is to say, it is provided with a series of regularly-spaced recesses, (as 17), preferably semicircular in form, or substantially so, and the unit graduations, or numbers representing them, are disposed above the respective recesses. Thus in the operation of the poise relatively to the scale member 15 the whole series of fractional numbers on the poise are successively presented to view in the recesses of the scale member directly beneath the respective unit indications on the latter, and hence the numbers on the poise can be positioned in close relation to the numbers on the scale member, and at the same time the lower edge of such members constitutes a series of registering portions which can be brought into accurate registry with the line graduations on the periphery of the poise, all as most clearly illustrated in Figs. 1 and 3.

Another feature of my invention concerns improved and simplified means for rotating the poise and moving it longitudinally in relation to the beam, which means is of the following character: 18 designates an externally-threaded or spirally-grooved stationary sleeve disposed midway between and parallel with the side members of the beam 12 and fixed at one end to an end member of the beam; and 19 designates a shaft which extends axially through said sleeve and is journaled at its respective ends within the sleeve and the opposite end of the beam. The poise is centrally bored and threaded to receive the thread of the sleeve, so that the poise when it is properly rotated, is caused to travel longitudinally of the sleeve in either direction, as desired. Affixed to one side of the poise, in concentric relation to the screw, is a tubular member 21 bearing at its outer end an apertured head 22 which is snugly fitted upon the shaft 19 so as to be rotatable with yet movable longitudinally on the shaft, that is to say, the shaft is conveniently flattened or otherwise shaped along a portion of its length, as at 23, to receive the correspondingly formed aperture of the head. The member 21 snugly encompasses the screw sleeve and thus affords an extended support and guide for the poise in its travel along the sleeve. Suitable shaft-rotating devices, including knobs 24 and confined transmitting gearing operated thereby, are provided at the respective ends of the shaft, whereby the latter can be manually turned in either direction as desired, and thus the tubular member and the poise, can be positively and accurately rotated by and with the shaft.

As a simple and efficient means to regulate the tension or friction of the poise on the threaded sleeve, I provide the poise with a central nut-like section 25 which is engaged with the thread of the sleeve and is adjustable lengthwise of the axis of the latter. This section is snugly fitted in a central socket 26 in the body of the poise and is secured thereby by set-screws 27, by the manipulation of which the section and the poise body may be relatively adjusted in order to cause their threads to bind more or less, as desired, on the opposing thread of the sleeve. Of course other means for regulating the friction or tension of the poise on the sleeve may be employed.

In my previous construction the tubular operating member to which the poise is connected was internally threaded and the end of the sleeve entering such member was provided with a threaded head engaged with the threads of such member, whereby the shaft rotated such member and poise in a manner to adjust the latter longitudinally of the beam. This construction was comparatively expensive owing mainly to the internal thread formation of the tubular member; but by the present modification the interengaged parts can be readily and cheaply made and assembled without sacrificing their accuracy of registry and operation.

The body of the poise is preferably provided with a radial socket 28 therein for the reception of shot 29 or the like, which is confined by a plug 30 entered into the open end of the socket. By varying the amount of the contained shot the weight of the poise can be adjusted to a nicety. (See Fig. 4.)

I claim—

1. A weighing machine of the character described having two coöperating scale members, whereof one comprises a circular body with peripherally-disposed indications thereon and the other comprises a plate with spaced indications thereon, the edge of said plate being arranged in proximity to the periphery of said body and having registering edge portions and recesses in alternation, and means for effecting a relative movement between said scale members to position the said edge portions and recesses in reading relation to the indications on the circular body.

2. In a weighing machine, the combination with a support for the material to be weighed, a beam, a poise mounted thereon having peripheral fractional graduations, and means for rotating said poise and moving it longitudinally in relation to the beam, of a scale fixed on the beam in close proximity to the periphery of the poise and parallel to the axis of rotation of the latter, said scale having unit indications thereon associated with spaced registering edge portions arranged to coöperate with the graduations on the poise.

3. In a weighing machine, the combination with a support for the material to be weighed, a beam, a poise mounted thereon having peripheral fractional graduations and indicating numbers, and means for rotating said poise and moving it longitudinally in relation to the beam, of a scale fixed on the beam in close proximity to the periphery of the poise and parallel to the axis of rotation of the latter, said scale having a series of unit indications thereon associated with spaced recesses, the latter being arranged to bridge and expose the successive indicating numbers on the poise when the poise is positioned in reading relation to the unit indications on the scale.

4. In a weighing machine, the combination with a support for the material to be weighed, a beam, a poise mounted thereon having peripheral fractional graduations and indicating numbers, and means for rotating said poise and moving it longitudinally in relation to the beam, of a scale fixed on the beam in close proximity to the periphery of the poise, said scale having registering edge portions alternating with spaced recesses and having also unit indications in close relation to said recesses, said recesses being arranged to bridge and expose the successive indicating numbers on the poise and said registering edge portions being arranged to aline with the fractional graduations on the poise when the poise is positioned in reading relation to the unit indications on the scale.

5. In a weighing machine, the combination of a support for the material to be weighed, a beam, an externally-threaded sleeve fixed on the beam, a poise operatively connected with the sleeve and having fractional graduations, a shaft extending axially through said sleeve, a sliding connection between said shaft and poise, a scale fixed on the beam and having unit indications arranged to coöperate with the fractional graduations on the poise, and means for rotating said shaft.

6. In a weighing machine, the combination of a support for the material to be weighed, a beam, an externally-threaded sleeve fixed on the beam, a poise operatively connected with the sleeve and having fractional graduations, a shaft extending axially through said sleeve, a tubular guide member extending from said poise and having a sliding connection with the shaft, a scale fixed on the beam and having unit indications arranged to coöperate with the fractional graduations on the poise, and means for rotating said shaft.

7. In a weighing machine having a poise body and a screw-threaded member upon which said body is mounted for rotary and longitudinal movement, said body having a central socket therein, the combination with said body and member, of a nut-like section fitted in the socket of the body and engaged with the thread of said member, and spaced connecting screws whereby said section and body can be relatively adjusted in order to bind their threads with more or less force against the thread of said member, and yet permit the rotary and longitudinal movement of said body.

8. In a weighing machine, the combination of a support for the material to be weighed, a beam, an externally-threaded sleeve fixed on the beam, a poise operatively connected with the sleeve and having fractional indications, an adjustable tension tional indications, an adjustable tension member between the screw-threaded sleeve and the poise, a shaft extending axially through said sleeve, a sliding connection between said shaft and the poise, a scale fixed on the beam, said scale having unit indications arranged to coöperate with the fractional indications on the poise, and means for rotating said shaft.

Signed at New York in the county and State of New York this 21st day of Sept. A. D. 1915.

ALFRED C. DODGE.

Copies of this patent may be obtained for five cents each, by addressing the "Commissioner of Patents, Washington, D. C."